United States Patent
Takada et al.

(10) Patent No.: US 8,703,029 B2
(45) Date of Patent: Apr. 22, 2014

(54) METHOD FOR PRODUCING POLYARYLENE SULFIDE RESIN COMPOSITION

(75) Inventors: Kazunari Takada, Shizuoka (JP); Raita Nishikawa, Shizuoka (JP); Katsuhei Ohnishi, Shizuoka (JP)

(73) Assignee: Polyplastics Co., Ltd., Minato-ku, Tokyo (JP)

( * ) Notice: Subject to any disclaimer, the term of this patent is extended or adjusted under 35 U.S.C. 154(b) by 688 days.

(21) Appl. No.: 12/937,390

(22) PCT Filed: Apr. 15, 2009

(86) PCT No.: PCT/JP2009/001727
§ 371 (c)(1),
(2), (4) Date: Oct. 12, 2010

(87) PCT Pub. No.: WO2009/128259
PCT Pub. Date: Oct. 22, 2009

(65) Prior Publication Data
US 2011/0037193 A1    Feb. 17, 2011

(30) Foreign Application Priority Data
Apr. 17, 2008   (JP) .................. 2008-107911

(51) Int. Cl.
*D01F 1/02*  (2006.01)
(52) U.S. Cl.
USPC .. 264/211; 264/102; 264/211.21; 264/211.23
(58) Field of Classification Search
USPC .................. 264/102, 211, 211.21, 211.23
See application file for complete search history.

(56) References Cited

U.S. PATENT DOCUMENTS

| | | | | |
|---|---|---|---|---|
| 4,935,473 A | * | 6/1990 | Fukuda et al. | 525/537 |
| 2004/0164439 A1 | * | 8/2004 | Koyama | 264/102 |
| 2007/0194478 A1 | * | 8/2007 | Aoki et al. | 264/140 |
| 2007/0299199 A1 | * | 12/2007 | Miura et al. | 524/553 |

FOREIGN PATENT DOCUMENTS

| | | |
|---|---|---|
| CA | 2021158 | 7/1990 |
| JP | 1-089208 A | 4/1989 |
| JP | 1-146955 A | 6/1989 |
| JP | 3-050267 A | 3/1991 |

(Continued)

OTHER PUBLICATIONS

International Search Report (PCT/ISA/210) for PCT/JP2009/001727 dated Jul. 21, 2009.

*Primary Examiner* — Amjad Abraham
*Assistant Examiner* — Ninh Le
(74) *Attorney, Agent, or Firm* — Buchanan Ingersoll & Rooney P.C.

(57) ABSTRACT

A method is provided for obtaining a polyarylene sulfide resin composition with a low chlorine content, which has high fluidity and high quality and produces less burrs. Specifically, a method is provided wherein a polyarylene sulfide resin composition is produced by melting and mixing (A) a polyarylene sulfide resin, (B) an inorganic filler, and (C) an alkoxysilane compound. In this method, (A) a polyarylene sulfide resin having a melt viscosity of 80-400 Pa·s (at a temperature of 310° C. and a shear rate of 1200/sec) and a chlorine content of 1000-2000 ppm is supplied from a raw material feed port of a specific extruder, and then extruded at two kneading parts within the range of [shear rate (1/sec)× kneading time (sec)=1600-6000], thereby producing a polyarylene sulfide resin composition having a melt viscosity of 150-330 Pa·s (at a temperature of 310° C. and a shear rate of 1200/sec) and a chlorine content of not more than 950 ppm.

20 Claims, 2 Drawing Sheets

(56) References Cited

FOREIGN PATENT DOCUMENTS

| JP | 8-157716 A | | 6/1996 | |
| JP | 9-153383 A | | 6/1997 | |
| JP | 2002120271 A | * | 4/2002 | ............. B29C 47/64 |
| JP | 2005171184 A | * | 6/2005 | ............. C08L 81/02 |
| JP | 2006-045451 A | | 2/2006 | |
| JP | 2009256480 A | * | 11/2009 | |

* cited by examiner (a)  (b)

METHOD FOR PRODUCING POLYARYLENE SULFIDE RESIN COMPOSITION

TECHNICAL FIELD

The present invention relates to a method for producing polyarylene sulfide resin composition with a reduced content of chlorine.

BACKGROUND ART

Since polyarylene sulfide (hereinafter abbreviated as PAS) as represented by polyphenylene sulfide (hereinafter abbreviated as PPS) resin has high heat resistance, mechanical properties, chemical resistance, dimensional stability and fire retardancy, it is widely used for component materials of electrical and electronic equipments, automobile equipments, chemical equipments, and the like.

Meanwhile, from the viewpoint of reduction of environmental load, the demand for the reduction of halogen content of materials is increasing recently. Since PAS resins can be obtained by polymerizing p-dichlorobenzene with alkali metal sulfide or alkali metal hydrosulfide as raw materials, they inevitably have the property of containing chlorine, being a kind of halogen, remaining at the end of the polymers while they don't contain chlorine in the main molecular skeletons. From the viewpoint of the environment problem described above, PAS resins having a low level of contained chlorine are required in the market, but it has been considered technically extremely difficult to provide PAS resins having a reduced chlorine level, excellent molding and processing properties without impairing excellent properties of PAS resins.

Further, since PAS resins have good compatibilities with inorganic fillers, they are generally often used as complex materials with inorganic fillers added. By complexation of materials, the content of chlorine in the form of resin composition can be reduced to some extent, but in consideration of melt flowability and mechanical strength, the addition of inorganic fillers is limited, and thus the request in the market for the reduction of chlorine level cannot be satisfied by using complexation technology alone.

Further, the chlorine concentration in the polymer usually depends on molecular weight of the polymer. Namely, a low-molecular-weight polymer with a high total number of terminals of the molecule has a high chlorine concentration, while a high-molecular-weight polymer with a low total number of terminals of the molecule thereby h has a low chlorine concentration. For that reason, to obtain a PAS resin composition with a low chlorine level, a high-molecular-weight polymer is preferably used as a raw material. Further, PAS resins are divided broadly into two types, thermal crosslinking-type and linear (straight chain)-type by their molecular structures. The thermal crosslinking-type PAS resins generally have a high chlorine concentration as they can be obtained by oxidative crosslinking through the use of a low-molecular-weight PAS resin with a high chlorine concentration as a raw material. To obtain a PAS resin composition with a low level of contained chlorine, the use of linear type PAS resins is preferable.

On the other hand, there may be a problem in which flash tends to occur during injection molding when a linear type PAS resin is used. To solve this problem, conventional methods for adding a variety of alkoxysilane compounds have been known (for example, JP-A 1-89208, JP-A 9-153383 and JP-A 1-146955). However, there is a problem that a high reactivity between a variety of alkoxysilane compounds and PAS resin increases the melt viscosity of the resin, and thus deteriorates flowability.

For the purposes of reduction of chlorine, using high-molecular-weight linear type polymers as a raw material is preferable as described above, but if alkoxysilane is added to solve a problem of flashing defect, flowability decreases, which is not preferable for practical purposes.

DISCLOSURE OF THE INVENTION

As stated above, a PAS resin composition having a reduced flashing defect, a high flowability and a low level of contained chlorine is required in the market, but still any method for producing PAS resin composition which satisfies all of these requirements has not been known until now.

The present inventors have strenuously studied to solve the matters described above and found that a PAS resin composition having a reduced flashing defect, a high flowability, a high quality and a low content of chlorine can be obtained by a melt kneading method using a particular PAS resin under a particular condition, resulting in having completed the present invention.

Namely, the present invention is a method for producing a polyarylene sulfide resin composition having a melt viscosity of 150 to 330 Pa·s (at a temperature of 310° C. and a shear rate of 1200/sec) and a chlorine amount of 950 ppm or less, including melt kneading (A) polyarylene sulfide resin, (B) an inorganic filler and (C) an alkoxysilane compound to produce the polyarylene sulfide resin composition, in which extrusion includes the following steps:

supplying (A) polyarylene sulfide resin having a melt viscosity of 80 to 400 Pa·s (at a temperature of 310° C. and a shear rate of 1200/sec) and a chlorine content of 1000 to 2000 ppm through (1) raw material-feeding port of an extruder, supplying (C) alkoxysilane compound before plasticizing the resin, plasticizing the supplied resin at (2) plasticizing zone, melt-kneading the plasticized resin at (3) kneading zone-a, feeding (B) inorganic filler into the melt-kneaded resin through (6) auxiliary material-feeding port, then, kneading the melt-kneaded resin and the inorganic filler in (7) kneading zone-b, degassing the resin under reduced pressure through (8) vacuum vent, and extruding the polyarylene sulfide resin composition obtained by kneading from (9) die mounted at an outlet of the extruder, the above defined steps being performed in the order, wherein the extrusion in (3) kneading zone-a and (7) kneading zone-b is conducted under the condition of [shear rate (1/sec)×kneading time (sec)=1600-6000 (the kneading time is the total kneading time in (3) kneading zone-a and (7) kneading zone-b)].

EXPLANATION OF SYMBOLS

Figure 1:
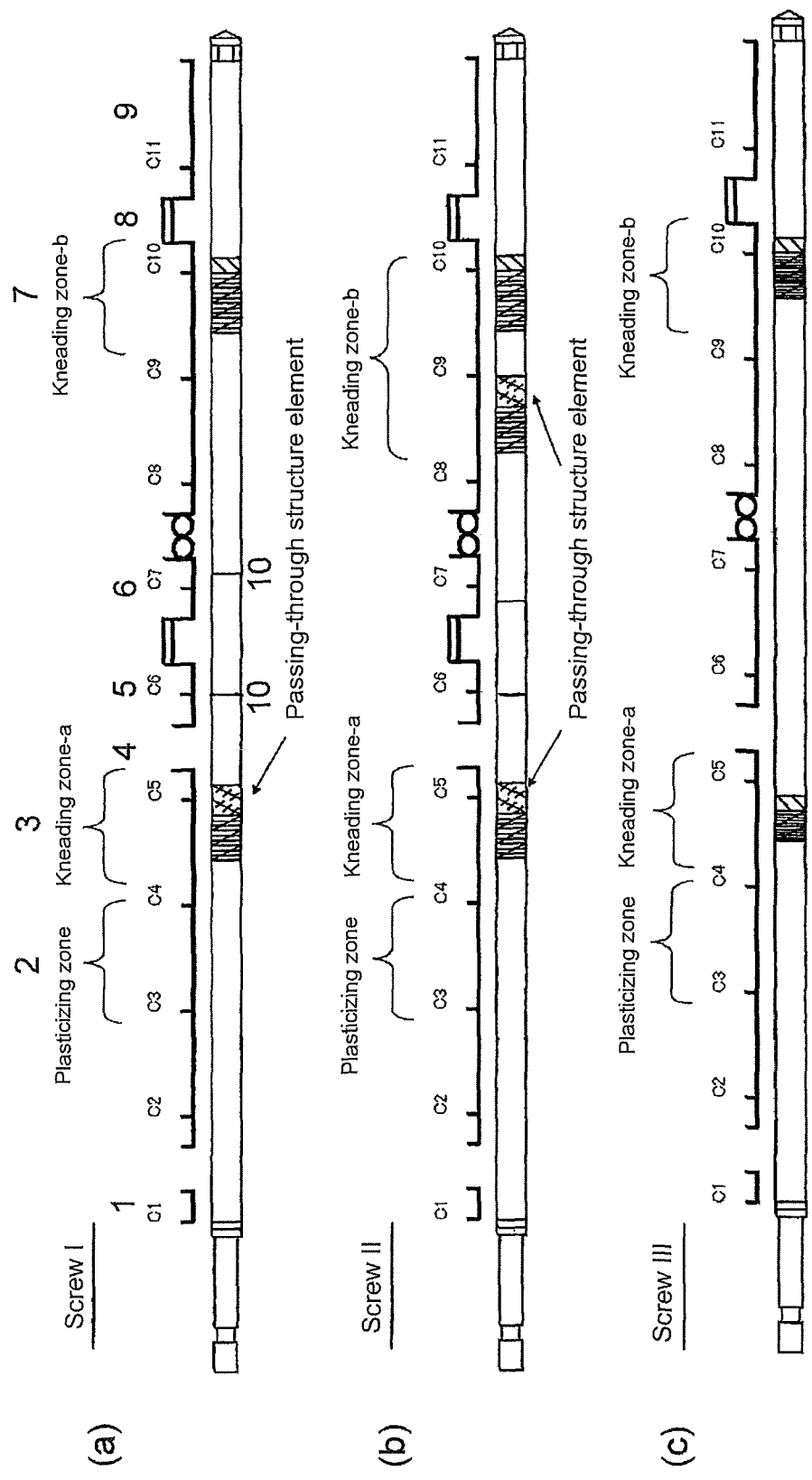
[FIG. 1] shows the configurations of extruder screws. (a) and (b) are for use in the present invention. (c) is a configuration of a screw generally used.

1. Raw material-feeding port
2. Plasticizing zone

3. Kneading zone-a
4. Open vent
5. The second vacuum vent port
6. Auxiliary material-feeding port
7. Kneading zone-b
8. The first vacuum vent port
9. Die zone

DETAILED DESCRIPTION OF THE INVENTION

PAS resin as (A) is mainly composed of —(Ar—S)— (wherein Ar is arylene group) as a repeating unit. Examples of the arylene group are p-phenylene group, m-phenylene group, o-phenylene group, substituted phenylene group, p,p'-diphenylenesulfone group, p,p'-biphenylene group, p,p'-diphenylene ether group, p,p'-diphenylenecarbonyl group and naphthalene group.

In this case, among the arylene sulfide groups composed of the above mentioned arylene groups, besides polymers using the same repeating unit, or homopolymer, copolymers containing different repeating units may sometimes be preferred in view of the processability of the composition.

Specifically preferred homopolymers are polyphenylene sulfide having the repeating unit of p-phenylene sulfide group, which uses p-phenylene group as an arylene group. Further, as a copolymer, the combinations of two or more types of different arylene sulfide groups composed of the above mentioned arylene groups can be used, and the combinations containing p-phenylenesulfide group and m-phenylenesulfide group are more preferably used in particular. Among these, those containing p-phenylenesulfide group at 70 mol % or more, and preferably 80 mol % or more, are suitable in view of physical properties such as heat resistance, moldability, mechanical properties and the like.

Further, among these PAS resins, there can be preferably used the high-molecular-weight polymers having a substantially straight chain structure which can be obtained by the condensation polymerization of a monomer mainly composed of a bifunctional halogen aromatic compound. However, besides the PAS resins having a straight chain structure, there can also be used those polymers having a part-branched or -crosslinked structure formed by using a small amount of monomer such as poly-halo aromatic compound containing three or more halogen functional groups at the time of condensation polymerization. Further, those moldability-and-processability improved polymers having an increased melt viscosity obtained by heating a low-molecular-weight polymer having a straight chain structure to a high temperature in the presence of oxygen or an oxidizing agent for oxidative crosslinking or thermal crosslinking can also be used and the mixtures thereof can also be used.

Moreover, the PAS resin used in the present invention is preferably subjected to washing with acid, hot water or organic solvent (or combination thereof) after polymerization to remove impurities such as byproducts and thus to purify the resin.

Under these circumstances, the chlorine content in the PAS resin is essentially from 1000 to 2000 ppm. As long as the chlorine content is from 1000 to 2000 ppm, the method for producing PAS resin is not limited in particular.

The chlorine content in the PAS resin composition is reduced by feeding an inorganic filler, but it becomes difficult to achieve the desired chlorine content in the PAS resin composition of 950 ppm or less if the chlorine concentration of the PAS resin exceeds 2000 ppm. Further, it is difficult to obtain a PAS resin with the chlorine content of less than 1000 ppm by a usual production method.

Further, the melt viscosity of the (A) PAS resin is from 80 to 400 Pa·s. An extremely low melt viscosity makes it very difficult to obtain PAS resin having a chlorine concentration of 1000 to 2000 ppm, while an extremely high melt viscosity makes it difficult to lower the melt viscosity of PAS resin composition compounded with an inorganic filler and alkoxysilane, which is not favorable.

Further, to obtain (A) PAS resin having the desired chlorine concentration, a PAS resin having a lower content of chlorine and a straight chain structure is selected rather than crosslinking-type PAS resin with a higher content of chlorine, which is obtained by thermal-crosslinking a low-molecular-weight polymer having a high chlorine concentration.

Further, as (A) PAS resin, there is preferably used the one treated with acid in the post-processing step after polymerization as the resin is subjected to reaction with alkoxysilane which is added for the reduction of flashing defect during injection molding, and at that time the resin pH is preferably 4-7. An extremely high resin pH makes the reaction of the resin with alkoxysilane insufficient and also makes its ability to inhibit flash occurrence insufficient. Further, since even an extremely low resin pH makes the reaction of resin with alkoxysilane unstable, those conditions are not suitable.

The type of inorganic filler as (B) is not limited in particular, but it's an essential component to keep the chlorine amount of the obtained composition 950 ppm or less and to impart a sufficient mechanical strength to the resin. Examples of inorganic filler include the following: calcium carbonate powders such as light calcium carbonate, heavy or pulverized calcium carbonate or special calcium filler; calcined clays such as nepheline syenite fine powder, montmorillionite or bentonite; clays such as silane-modified clay (aluminum silicate powder); talc; silica (silicon dioxide) powders such as fused silica or crystalline silica; compounds containing silicate such as diatomaceous earth or quartz sand; pulverized materials of natural minerals such as pumice powder, pumice balloon, slate powder or mica powder; compounds containing alumina such as alumina, alumina colloid (alumina sol), alumina white or aluminum sulfate; minerals, such as barium sulfate, lithopone, calcium sulfate, molybdenum disulfide, graphite (black lead); glass fillers such as glass fiber, glass bead, glass flake or foamed glass bead; fly ash ball, volcanic glass hollow body, synthesized inorganic hollow body, single crystal potassium titanate, carbon fiber, carbon nanotube, carbon hollow sphere, carbon 64 fullerene, anthracite powder, artificial cryolite, titanium oxide, magnesium oxide, basic magnesium carbonate, dolomite, potassium titanate, calcium sulfite, mica, calcium silicate, aluminum powder, molybdenum disulfide, boron fiber, silicon carbide fiber, and the like.

Among them, fibrous inorganic fillers are preferred including, for example, glass fiber, asbesto fiber, carbon fiber, silica fiber, silica/alumina fiber, potassium titanate fiber, polyararnid fiber and the like.

The amount of component (B) compounded is preferably from 10 to 250 parts by weight and more preferably from 30 to 150 parts by weight to 100 parts by weight of (A) PAS resin. An extremely small amount of component (B) compounded does not lower the chlorine level of the obtained composition of 950 ppm or less, and also does not provide a sufficient mechanical strength, while an extremely large amount of that lowers the moldability and mechanical strength, which is not favorable.

(C) Alkoxysilane is essential for increasing the fluidity and reducing flashing defect during injection molding which are the object of the present invention. If (C) alkoxysilane is not used, a sufficient resin viscosity cannot be obtained, which results in poor shearing in the extruder, and thus sufficient molecule breaking needed for high fluidity cannot be obtained. In addition, extremely long flash tends to occur during injection molding. Causing PAS resin to react with (C) alkoxysilane can increase the melt viscosity in the extruder and enhance the shear force in extrusion, which results in breaking molecules of PAS resin efficiently, and in giving sufficient flowability and reducing effect of flashing defect.

The type of (C) alkoxysilane is not limited in particular, and includes epoxyalkoxysilane, aminoalkoxysilane, vinylalkoxysilane, mercaptoalkoxysilane and the like. One or two or more of them may be used. Meanwhile, alkoxy group has 1 to 10 carbon atoms, and preferably has 1 to 4 carbon atoms.

Examples of epoxyalkoxysilane include the following: γ-glycidoxypropyltrimethoxysilane, β-(3,4-epoxycyclohexyl)ethyltrimethoxysilane, γ-glycidoxypropyltriethoxysilane and so on.

Examples of aminoalkoxysilane include the following: γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane, γ-diallylaminopropyltriethoxysilane and the like.

Examples of vinylalkoxysilane include the following: vinyltrimethoxysilane, vinyltriethoxysilane, vinyltris(β-methoxyethoxy)silane and the like.

Examples of mercaptoalkoxysilane include the following: γ-mercaptopropyltrimethoxysilane, γ-mercaptopropyltriethoxysilane and the like.

The preferred alkoxysilanes for use are epoxyalkoxysilane and aminoalkoxysilane, and γ-aminopropyltriethoxysilane is particularly preferable.

The amount of the alkoxysilane compound to be used is preferably from 0.1 to 3 parts by weight, and more preferably from 0.2 to 2 parts by weight to 100 parts by weight of (A) PAS resin. An extremely small amount of alkoxysilane compound to be used does not provide a sufficient resin viscosity, making shear in the extruder insufficient, resulting in making molecule breaking insufficient because of high fluidity, and in extremely long flash during injection molding. Furthermore, an extremely large amount of alkoxysilane compound used leads a problem of generation of excessive gas, which is not favorable.

The melt viscosity of PAS resin composition obtained is from 150 to 330 Pa·s, and preferably from 150 to 300 Pa·s. An extremely low melt viscosity makes moldability unstable and promotes flashing defect, which is not favorable. Further, an extremely high melt viscosity makes flowability insufficient and molding stability poor, or makes the production of thin wall molded articles difficult.

Next, the production method of the present invention will be explained in detail.

FIG. 1 shows the configurations of extruder screws. (a) and (b) are for use in the present invention. (c) is a generally used screw configuration. The present invention altered the configuration of generally used one shown in FIG. 1 (c).

The present invention uses an extruder like FIG. 1 (a) and the extrusion step consists of:

supplying (A) PAS resin through (1) raw material-feeding port of an extruder, supplying (C) alkoxysilane compound before plasticizing the resin, plasticizing the supplied resin at (2) plasticizing zone, melt-kneading the plasticized resin at (3) kneading zone-a, feeding (B) inorganic filler into the melt-kneaded resin through (6) auxiliary material-feeding port, then, kneading the melt-kneaded resin and the inorganic filler in (7) kneading zone-b, degassing the resin under reduced pressure through (8) vacuum vent, and extruding the polyarylene sulfide resin composition obtained by kneading from (9) die mounted at an outlet of the extruder, the extrusion step being performed in the order, wherein the extrusion in (3) kneading zone-a and (7) kneading zone-b is conducted under the condition of [shear rate (1/sec)×kneading time (sec)=1600-6000 (the kneading time is the total kneading times in (3) kneading zone-a and (7) kneading zone-b)].

The present invention lowers the melt viscosity by breaking molecules of the PAS resin by shear force obtained through the use of a melt-kneading machine. However, the aimed composition cannot be obtained just by using methods such as increasing the screw rotation speed of the extruder (increasing the shear rate), extending the melt kneading time, installing a screw element having a configuration capable of producing a high shear, increasing the temperature of the extruder cylinder (to promote thermal decomposition), decreasing the cylinder temperature (to promote shear), increasing the L/D of the screw and the like.

That is to say, some problems may occur in that promoting molecule breaking in the extruder alone may just generate an excessive amount of gas at the time of the extrusion, making it impossible to obtain appropriate resin strands and pellet shapes, or may increase the occurrence of eye discharges in the die zone of the extruder, which makes it difficult to produce pellets stably. Alternatively, promoting molecule breaking in the extruder alone may increase mold deposit during injection molding. For producing the appropriate form of pellets, a method in which the melt-kneading by the extruder is further repeated one or more times may be used, but problems such as the deterioration of physical properties caused by the breaking of fibrous fillers, or the increase of the cost caused by the increase of the number of melt-kneading steps, which are unfavorable.

To avoid the occurrence of such problems, in preparing resin composition by melt kneading, the following steps are needed: the step of plasticizing the supplied resin in (2) plasticizing zone, then the added step of melt-kneading the plasticized resin in (3) kneading zone-a, the step of feeding the inorganic filler, and kneading step in (7) kneading zone-b, and it is essential to set [shear rate (1/sec)×kneading time (sec)] of both melt kneading zones of (3) kneading zone-a and (7) kneading zone-b from 1600 to 6000, preferably from 2100 to 4200, and more preferably from 2200 to 4100.

If these kneading conditions are satisfied, preparation can be conducted by devising, in some degree, equipment used in preparing synthesized resin compositions. Generally, pellets for molding are prepared by melt-kneading through the use of a single-screw or twin-screw extruder. To satisfy the kneading conditions described above, a twin-screw extruder having a high degree of freedom in the screw structure is preferably used. The twin-screw extruder may have co-rotating or counter-rotating screws. The co-rotating twin-screw extruder may have triple-flight type or double-flight type. The counter-rotating twin screw extruder may have parallel axis type or bent axis ones.

In the present invention, the shear rate and the kneading time are calculated by the following equation.

$$\gamma c = \pi \cdot D \cdot N / 60 \cdot \sigma \qquad \text{[Equation 1]}$$

[wherein:

γc: Shear Rate (1/sec)

D: Inside Diameter of Cylinder of Extruder (cm)

N: Screw Rotation Speed (1/min)
σ: Depth of Screw Channel (cm)]

$$T=3600 \cdot A \cdot L \cdot D \cdot \rho / 1000 \cdot Q \quad \text{[Equation 2]}$$

[wherein:
T: kneading time (sec)
  A: space cross-zoneal area ($cm^2$)
  L: l/d
  (l: sum of lengths of screw elements of kneading zones, and
  d: diameter of screw elements of kneading zones
  D: inside diameter of cylinder (cm)
  ρ: material density ($g/cm^3$)
  Q: throughput rate (kg/hr)]

More specifically, the production method makes use of the following conditions: the shear rate of the kneading zone is from 50/sec to 110/sec (preferably from 55/sec to 100/sec) in the extrusion step shown in FIG. 1 (a), and the total kneading time in (3) kneading zone-a and (7) kneading zone-b is from 20 seconds to 60 seconds (preferably from 30 seconds to 55 seconds, and more preferably from 40 seconds to 55 seconds).

Further, the kneading time in (3) kneading zone-a is preferably from 8 seconds to 20 seconds, and the kneading time in (7) kneading zone-b is preferably from 8 seconds to 52 seconds (particularly from 15 seconds to 40 seconds). Expanding the kneading time in (7) kneading zone-b can lower the shear rate, which thus increases the degree of freedom of melt-kneading.

The screw elements for achieving the production method described above are composed of a transfer element consisting of a forward flight, and elements for the plasticizing zone and elements for kneading zones. There is no limitation to the elements for the plasticizing zone in particular, and the elements may be designed appropriately depending on the types of resin and filler. There is no limitation to the elements for kneading zones in particular as long as the defined shear rate and kneading time can be obtained, and generally the elements are used by combining screw elements such as a reverse flight, a seal ring, a forward kneading disk, a reverse kneading disk and the like.

Among them, the screw element preferably used includes a structure in which a part of molten resin passes through in the opposite direction (upstream direction) to the flow direction. The shape of the passing-through structure is not limited in particular and includes notch shape, gear shape, hole shape and the like. Among them, the notch shape described in FIG. 2 in JP-A 2002-120271 is preferred. Further, the ratio of a structure in which a part of molten resin passes through in the direction opposite to the flow direction is such that the ratio of the area of the passing-through structure zone to the area of a circle having a diameter of the maximum dimension part is from 5 to 40%, when the element is projected in the screw axis direction.

Here, the fact that the ratio of a structure in which a part of molten resin passes through in the direction opposite to the flow direction is from 5 to 40% indicates that the ratio of the area of the passing-through structure zone to the area of a circle having the diameter of the maximum dimension part is from 5 to 40%, when the element is projected in the screw axis direction.

Figure 2:
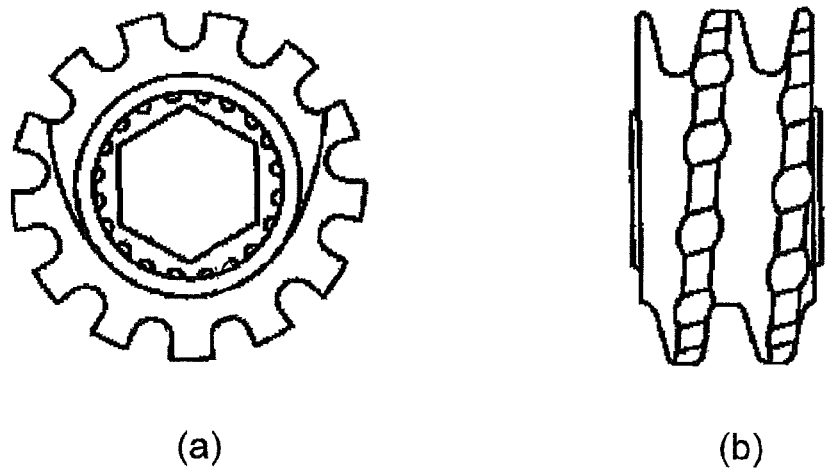
[FIG. 2] shows an example of a screw element having a structure in which a part of molten resin passes through in the direction opposite to the flow direction. (a) shows the front view and (b) shows the side view.

Preferably, one or more screw elements having a structure in which a part of molten resin passes through in the direction opposite to the flow direction is introduced into the elements of (3) kneading zone-a, and more preferably one or more such screw elements are also introduced into (7) kneading zone-b as seen in FIG. 2 (b).

Next, preferably two or more vacuum vents for removing volatile components, degradation products, substances with a high boiling point and the like from the melt-kneaded resin composition are provided. Removing volatile contents and the like efficiently from vent ports further improves the stability of strands extruded from the die zone and the quality stability of resin pellets obtained.

Generally, a vacuum vent is provided at (8) located in the downstream of (7) kneading zone-b, but when two vents are provided, another one is provided between (3) kneading zone-a and (6) auxiliary material-feeding port. Furthermore, in order to perform effective degassing under reduced pressure from a vent port, the inside of the extruder near the vent port needs to be maintained under reduced pressure, and a sealing structure needs to be installed, which allows the plasticized resin to be filled up perfectly in the extruder. To obtain a sealing structure, in addition to a reverse flight, devices capable of geometrically increasing pressure on screw rotation such as a seal ring and a reverse kneading are preferably used at the front and the rear of the vent port, as necessary. The kneading zone can be used as an alternative to a sealing structure.

The degrees of pressure reduction at (8) the first vent port and (5) the second vent port are from 0 to 380 Torr (from 0 to 50.7 kPa), practically from 1 to 200 Torr (from 0 to 26.7 kPa), and preferably from 10 to 100 Torr (from 1.3 to 13.3 kPa). There can be a common degassing system or different degassing systems from (8) the first vent port and (5) the second vent port, and the degassing rates of (8) the first vent port and (5) the second vent port are such rates that the above-described degrees of pressure reduction can be maintained at (8) the first vent port and (5) the second vent port. Traps and the like for collecting substances with a high boiling point may be installed between each vent port and a decompression unit.

Further, in performing the production method according to the present invention, in order to remove volatile components, degradation products, substances with a high boiling point and the like from the melt-kneaded resin composition and to increase the feeding stability of raw materials from (1) raw material-feeding port, an open vent is more preferably provided between (3) kneading zone-a and (6) auxiliary material-feeding port. Further, when both of an open vent and a vacuum vent are provided between (3) kneading zone-a and (6) auxiliary material-feeding port, preferably, the open vent and the vacuum vent are provided in the order from the upstream side to enhance degassing efficiency.

Next, the combination use of (D) crystal nucleating agent further enhances the effects of the present invention, although it's not essential in particular. Widely known organic nucleating agents and inorganic nucleating agents can be used as a crystal nucleating agent for this purpose. Examples of inorganic substance include as follows: simple substances such as Zn powder, Al powder, graphite or carbon black; metal oxides such as ZnO, MgO, $Al_2O_3$, $TiO_2$, $MnO_2$, $SiO_2$ or $Fe_3O_4$; nitrides such as boron nitride; inorganic salts such as $Na_2CO_3$, $CaCO_3$, $MgCO_3$, $CaSO_4$, $CaSiO_3$, $BaSO_4$ or $Ca_3(PO_4)_3$; silica, talc, kaolin, clay, china clay and so on. Further, examples of organic substance includes as follows: organic salts such as calcium oxalate, sodium oxalate, calcium benzoate, calcium phthalate, calcium tartarate or magnesium stearate; heat resistant polymers; crosslinked substances of heat resistant polymers and so on. The particularly preferred are boron nitride; clays such as talc, kaolin, clay or china clay; polymer compounds having a crosslinked or branched structure, and the like. Here, polymer compounds having a crosslinked or branched structure may be either of those, for example, having a branched or crosslinked structure produced by polycondensation of a monomer partly having three or more functional groups, or ready-made polymeric substances to which a crosslinked or branched structure is imparted afterward.

Meanwhile, among the crystal nucleating agents described above, some overlap with (B) inorganic filler and those substances have both functions. To 100 parts by weight of (A) component, the amount to be used as (D) crystal nucleating agent is sufficiently from 0.01 to 3 parts by weight, and is preferably from 0.1 to 2 parts by weight.

Further, in addition to the above described components, a small amount of other thermoplastic resins can be supplementarily combined, depending on the purpose with the PAS resin composition of the present invention. Other thermoplastic resins used there may be any as long as they are stable at high temperature.

Further, depending on the required performance, widely known substances, for example, stabilizers such as antioxidants; fire retardants; colorants such as dyes or pigments and lubricants, which are usually added to thermoplastic resins, can be added to the PAS resin composition for use in the present invention appropriately within the range not impairing the effects of the present invention.

The resin molding method for use in the present invention is not limited in particular, and usually widely known molding methods for thermoplastic resin such as injection molding, extrusion molding, vacuum molding, compression molding and the like can be used, and the most preferred is injection molding.

EXAMPLES

In the following, the present invention is explained in detail with reference to Examples, but the present invention is not be limited to them.

Example 1

Extruder manufactured by The Japan Steel Works, LTD., TEX44 (screw diameter: 44 mm, L/D 38.5).

FIG. 1 (a) shows the schematic representation of the screw of the extruder.
C1: (1) raw material-feeding port
C3-C4: (2) plasticizing zone
C4-C5: (3) kneading zone (forward kneading: element containing notch zone)
C5: (4) open vent
C6: (5) the second vacuum vent port
C7: (6) auxiliary material-feeding port
C9-C10: (7) kneading zone (forward kneading: reverse flight)
C10: (8) the first vacuum vent port (9) die zone (10) Sealing zones were installed at the front and the rear of the second vacuum vent port (5).
(2) Extrusion Conditions
Cylinder temperature: from resin feed side toward die head side, see below:
(C1)50-(C2)100-(C3)300-(C4)320-(C5)320-(C6)320-(C7)280-(C8)280-(C9)280-(C10)280-(C11)280-(die)300
(3) Screw Shape (an Element Having a Passing-Through Structure)
An element having a notch zone as shown in FIG. 2.
(4) Raw Materials to be Used
(A) PAS Resin
A-1: Manufactured by Kureha Corporation, Fortron KPS W214A (linear PPS, 310° C., viscosity being 130 Pa·s at a shear rate of 1200 sec$^{-1}$, Cl level being 1400 ppm, resin pH=6.0)

A-2: Manufactured by Kureha Corporation, Fortron KPS W220A (linear PPS, 310° C., viscosity being 210 Pa·s at a shear rate of 1200 sec$^{-1}$, Cl level being 1700 ppm, resin pH=6.0)

A-3: Manufactured by Kureha Corporation, Fortron KPS W203A (linear PPS, 310° C., viscosity being 28 Pa·s at a shear rate of 1200 sec$^{-1}$, Cl level being 3800 ppm, resin pH=6.0)

A-4: Manufactured by Kureha Corporation, Fortron KPS W312 (linear PPS, 310° C., viscosity being 170 Pa·s at a shear rate of 1200 sec$^{-1}$, Cl level being 1500 ppm, resin pH=10.8)
(B) Fibrous Inorganic Filler
B-1: glass fiber (Manufactured by Nippon Electric Glass Co., Ltd., chopped strand having 13 μm diameter (ECS03T-717))
(C) Alkoxysilane
C-1: γ-aminopropyltriethoxysilane
(D) Crystal Nucleating Agent
D-1: boron nitride (Manufactured by Kawasaki Steel Corp., FS-1)
(5) Kneading and Extrusion Methods of Composition
The above described PAS resin and alkoxysilane were added into Henschel mixer (manufactured by MITSUI MIIKE MACHINERY Co., Ltd.) for mixing at 885 rpm for 2 minutes. The resulting mixture was supplied from the feed port of the extruder (1).

Glass fiber was supplied from (6) auxiliary material-feeding port by using a twin-shaft screw side-feeder.

The mixture and the glass fiber were controlled by using a weight feeder to obtain prescribed compositions shown in Table 1. The resin compositions were extruded into strands, and pellets were then obtained.

Examples 2-8, Comparative Examples 1-5

Pellets were obtained in the same manner as in Example 1 except for changing conditions according to Tables 1 and 2 as follows: the shape of extruder screw used, extrusion condition, shear rate, kneading time, the type of each component to be compounded, and the like. Meanwhile, in Comparative example 4, a small amount of eye discharges was found at the time of extrusion, and thus good extrusion cannot be obtained. Further, in Comparative example 5, a large amount of eye discharges was found at the time of extrusion, and thus good extrusion cannot be obtained.

Examples 9-10

By using TEX65 (screw diameter 65 mm, L/D 38.5) manufactured by The Japan Steel Works, LTD. as an extruder, pellets were obtained in the same manner as in Example 1 except for setting the cylinder temperature as follows and changing extrusion conditions as shown in Table 1, and were then evaluated. Meanwhile, the screw used was the same type as screw II.
<Cylinder Temperature>
(C1)50-(C2)250-(C3)330-(C4)330-(C5)330-(C6)330-(C7)300-(C8)280-(C9)280-(C10)280-(C11)280-(die)300

The evaluation method for Examples and Comparative example is as follows:
<<Measurement of Resin pH>>
6 g of a sample, 15 ml of acetone and 30 ml of purified water (manufactured by KANTO CHEMICAL CO., INC.) were placed in a flask at room temperature (15-25° C.), shaken for 30 minutes using a shaker, and then filtered through a separating funnel. The pH of the supernatant was measured with a pH meter.

<<Evaluation of Tensile Strength>>
Test pieces (width: 10 mm, thickness: 4 mm) prepared according to ISO3167 were molded and measured according to ISO527-1,2.

<<Measurement of Chlorine Content>>
Combustion ion chromatography was used for measurement.
(Measurement Conditions)
Ion Chromatograph: DX320 manufactured by DIONEX
Pre-treatment apparatus for combustion: AQF-100, ABC, WS-100,
GA-100 manufactured by Mitsubishi Chemical Corporation
Sample: 10 mg
Heater: Port Temp/900° C., Outlet Temp/1000° C.
Absorption solution: $H_2O_2$ 900 ppm
Internal standard: $PO_4^{3-}$ 25 ppm <<Measurement of Melt Viscosity>>
Melt viscosity was measured at 310° C. and a shear rate of 1200 (1/sec) by using Capillograph mounted with a 20.0 mm-long nozzle having an inside diameter of 1.0 mm.
Measuring Equipment: Capillograph 1B manufactured by TOYO SEIKI SEISAKU-SHO, LTD.

<Evaluation of Flashing Defect Level>
By using a die having a circular cavity mounted with a flash measuring zone of 20 μm die gap at the circumference, the length of flash was measured by performing injection molding with a minimum pressure necessary for completely filling the cavity, and measuring flash there.
(Cylinder temperature 320° C., Mold temperature 150° C.)

Figure 3:
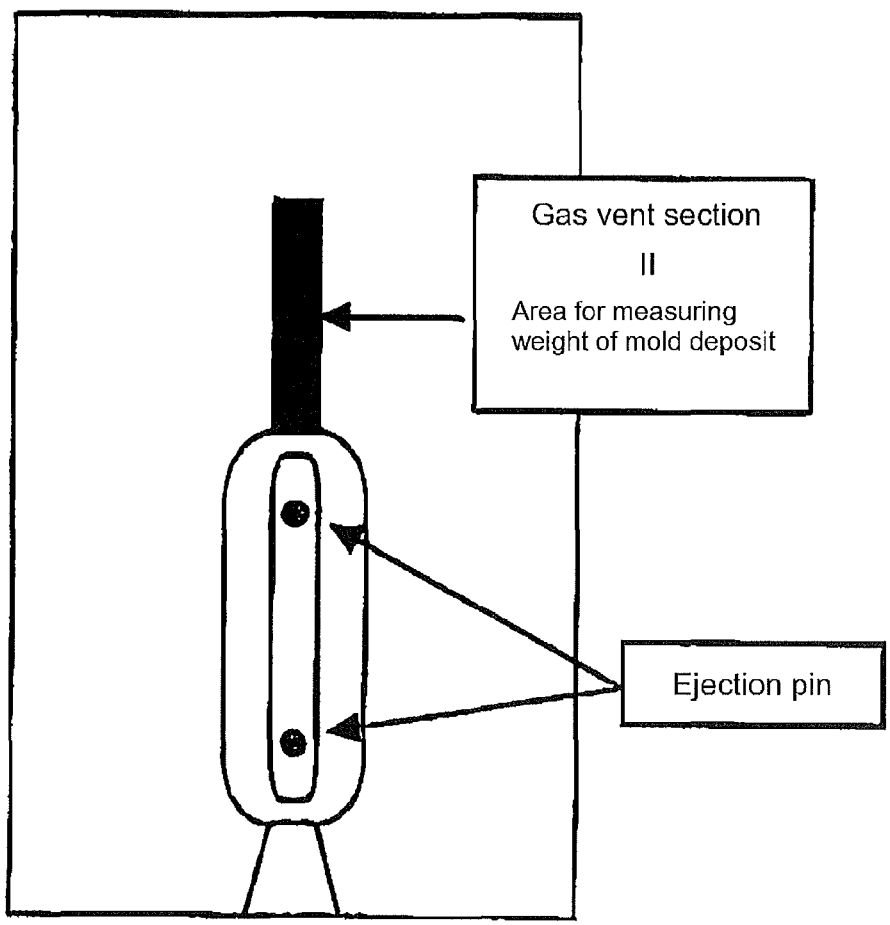
[FIG. 3] shows a molded article and an evaluation condition used in the evaluation of mold deposit.

<<Evaluation of Mold Deposit>>
Articles having particular shapes shown in FIG. 3 were molded continuously by an injection molding machine under the conditions described below, and the amount of deposit adhered to the die was evaluated. Specifically, 500 shots of test pieces were molded, and mold deposit adhered to the gas vent zone (movable side only) were collected and their weights (μg) were measured.
(Molding Conditions)
Injection molding machine: Fanuc S2000i 30A (manufactured by FANUC LTD.)
Cylinder Temperature: (cylinder) 320-320-305-290° C.
Injection Pressure: 50 MPa
Injection Rate: 60 m/min
Holding Time: 2 sec
Cooling Time: 7 sec
Molding Cycle: 12 sec
Mold Temperature: 60° C.

<<Evaluation of Extrusion Property>>
Foaming generated by gas on strands extruded from the die zone of the extruder was visually inspected.
Tables 1 and 2 show these results.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Screw | | I | I | I | II | II | II | I | II | II | II |
| Extruder | | TEX-44 | TEX-44 | TEX-44 | TEX-44 | TEX-44 | TEX-44 | TEX-44 | TEX-44 | TEX-65 | TEX-65 |
| Extrusion Conditions Throughput Rate (kg/h)/Screw Rotation Speed (rpm) | | 60/320 | 60/320 | 60/240 | 60/240 | 60/280 | 60/320 | 60/280 | 60/280 | 160/230 | 160/290 |
| Shear Rate | 1/sec | 87.5 | 87.5 | 65.6 | 65.6 | 76.5 | 87.5 | 76.5 | 76.5 | 66.4 | 83.8 |
| Total Kneading Period | Seconds | 31.1 | 31.1 | 31.1 | 46.6 | 46.6 | 46.6 | 31.1 | 46.6 | 51.7 | 51.7 |
| Shear Rate × Kneading Period | — | 2721 | 2721 | 2040 | 3057 | 3565 | 4078 | 2379 | 3565 | 3433 | 4332 |
| Kneading Period in Kneading Zone (a) | Seconds | 12 | 12 | 12 | 12 | 12 | 12 | 12 | 12 | 17.2 | 17.2 |
| (A) PAS Resin (100 Parts by Weight) | Type | A-1 | A-2 | A-1 | A-1 | A-1 | A-1 | A-1 | A-1 | A-1 | A-1 |
| (B) Fibrous Inorganic Filler | Type | B-1 | B-1 | B-1 | B-1 | B-1 | B-1 | B-1 | B-1 | B-1 | B-1 |
| | Parts by Weight | 67 | 67 | 67 | 67 | 67 | 67 | 67 | 67 | 67 | 67 |
| (C) Alkoxysilane | Type | C-1 | C-1 | C-1 | C-1 | C-1 | C-1 | C-1 | C-1 | C-1 | C-1 |
| | Parts by Weight | 1 | 0.8 | 1 | 1 | 1 | 1 | 1 | 1 | 1 | 1 |
| (D) Crystal Nucleating Agent | Type | | | | | | | | D-1 | | |
| | Parts by Weight | | | | | | | | 0.2 | | |
| Chlorine Content | ppm | 770 | 820 | 760 | 770 | 780 | 770 | 790 | 800 | 750 | 790 |
| Melt Viscosity | Pa·s | 260 | 270 | 320 | 270 | 230 | 215 | 280 | 230 | 260 | 230 |
| Tensile Strength | MPa | 185 | 150 | 192 | 185 | 185 | 183 | 187 | 185 | 190 | 193 |
| Flashing Defect Level | μm | 110 | 120 | 90 | 110 | 120 | 130 | 100 | 90 | 120 | 150 |
| Mold Deposit | μg | 13 | 11 | 13 | 11 | 12 | 13 | 13 | 11 | 11 | 14 |
| Extrusion Property (Presence of Foam) | — | Not Found | Not Found | Not Found | Not Found | Not Found | Not Found | Not Found | Not Found | Not Found | Slightly Found |

TABLE 2

| | | Comparative Examples | | | | |
|---|---|---|---|---|---|---|
| | | 1 | 2 | 3 | 4 | 5 |
| Screw | | I | III | I | III | III |
| Extruder | | TEX-44 | TEX-44 | TEX-44 | TEX-44 | TEX-44 |
| Extrusion Conditions Throughput Rate (kg/h)/Screw Rotation Speed (rpm) | | 60/200 | 80/200 | 60/320 | 80/200 | 100/325 |
| Shear Rate | 1/sec | 54.7 | 54.7 | 87.5 | 54.7 | 88.8 |
| Total Kneading Period | Seconds | 31.1 | 16.3 | 31.1 | 16.3 | 13 |
| Shear Rate × Kneading Period | — | 1701 | 892 | 2721 | 892 | 1154 |
| Kneading Period in Kneading Zone (a) | Seconds | 12 | 9.3 | 12 | 7 | 5.6 |
| (A) PAS Resin (100 Parts by Weight) | Type | A-1 | A-3 | A-4 | A-1 | A-1 |
| (B) Fibrous Inorganic Filler | Type | B-1 | B-1 | B-1 | B-1 | B-1 |
| | Parts by Weight | 67 | 67 | 67 | 67 | 67 |

TABLE 2-continued

|  |  | Comparative Examples | | | | |
| --- | --- | --- | --- | --- | --- | --- |
|  |  | 1 | 2 | 3 | 4 | 5 |
| (C) Alkoxysilane | Type |  | C-1 | C-1 | C-1 | C-1 |
|  | Parts by Weight |  | 1 | 1 | 1 | 1 |
| (D) Crystal Nucleating Agent | Type |  |  |  |  |  |
|  | Parts by Weight |  |  |  |  |  |
| Chlorine Content | ppm | 750 | 2250 | 790 | 780 | 720 |
| Melt Viscosity | Pa·s | 290 | 250 | 260 | 390 | 260 |
| Tensile Strength | MPa | 190 | 195 | 185 | 190 | 194 |
| Flashing Defect Level | μm | 330 | 80 | 300 | 120 | 150 |
| Mold Deposit | μg | 14 | 25 | 13 | 14 | 24 |
| Extrusion Property (Presence of Foam) | — | Not Found | Not Found | Not Found | Not Found | Found Substantially |

The invention claimed is:

1. A method for producing a polyarylene sulfide resin composition having a melt viscosity of 150 to 330 Pa·s (at a temperature of 310° C. and a shear rate of 1200/sec) and a chlorine amount of 950 ppm or less, comprising melt kneading (A) polyarylene sulfide resin, (B) an inorganic filler and (C) an alkoxysilane compound to produce the polyarylene sulfide resin composition, in which extrusion comprises the following steps:

supplying (A) polyarylene sulfide resin having a melt viscosity of 80 to 400 Pa·s (at a temperature of 310° C. and a shear rate of 1200/sec) and a chlorine content of 1000 to 2000 ppm through (1) raw material-feeding port of an extruder, supplying (C) alkoxysilane compound before plasticizing the resin, plasticizing the supplied resin at (2) plasticizing zone, melt-kneading the plasticized resin at (3) kneading zone-a, feeding (B) inorganic filler into the melt-kneaded resin through (6) auxiliary material-feeding port, then, kneading the melt-kneaded resin and the inorganic filler in (7) kneading zone-b, degassing the resin under reduced pressure through (8) vacuum vent, and extruding the polyarylene sulfide resin composition obtained by kneading from (9) die mounted at an outlet of the extruder, the above defined steps being performed in the order, wherein the extrusion in (3) kneading zone-a and (7) kneading zone-b is conducted under the condition of [shear rate (1/sec)×kneading time (sec)= 1600-6000 (the kneading time is the total kneading time in (3) kneading zone-a and (7) kneading zone-b)].

2. The method for producing a polyarylene sulfide resin composition according to claim 1, wherein the extrusion in (3) kneading zone-a and (7) kneading zone-b is conducted in [shear rate (1/sec)×kneading time (sec)=2100-4200].

3. The method for producing a polyarylene sulfide resin composition according to claim 1, wherein the extruder is a twin-screw extruder.

4. The method for producing a polyarylene sulfide resin composition according to claim 1, wherein the shear rate in (3) kneading zone-a and (7) kneading zone-b is from 50/sec to 110/sec, and the total kneading time in (3) kneading zone-a and (7) kneading zone-b is from 20 seconds to 60 seconds.

5. The method for producing a polyarylene sulfide resin composition according to claim 1, wherein the shear rate in (3) kneading zone-a and (7) kneading zone-b is from 55/sec to 100/sec and the total kneading time in (3) kneading zone-a and (7) kneading zone-b is from 30 seconds to 55 seconds.

6. The method for producing a polyarylene sulfide resin composition according to claim 1, wherein the melt-kneading is conducted by introducing one or more screw elements having a structure which allows a part of molten resin to pass through in a direction opposite to a flow direction into (3) kneading zone-a, wherein a ratio of a structure in which a part of molten resin passes through in the direction opposite to the flow direction is such that a ratio of an area of a passing-through structure zone to an area of a circle having a diameter of a maximum dimension part of the screw element is from 5 to 40%, when the screw element is projected in a screw axis direction.

7. The method for producing a polyarylene sulfide resin composition according to claim 6, wherein the melt-kneading is conducted by further introducing one or more screw elements having a structure which allows a part of molten resin to pass through in a direction opposite to a flow direction into (7) kneading zone-b, wherein the ratio of a structure in which a part of molten resin passes through in the direction opposite to the flow direction is such that the ratio of the area of the passing-through structure zone to the area of a circle having a diameter of a maximum dimension part of the screw element is from 5 to 40%, when the element is projected in the screw axis direction.

8. The method for producing a polyarylene sulfide resin composition according to claim 6, wherein a shape of the screw element having a structure in which a part of molten resin passes through in a direction opposite to a flow direction has a notch zone-formed structure at some points of its end.

9. The method for producing a polyarylene sulfide resin composition according to claim 1, wherein a second vacuum vent is further provided between (3) kneading zone-a and (6) auxiliary material-feeding port and elements in a form of a sealing structure are installed at a front and a rear of the second vacuum vent to conduct degassing or evacuation through two vacuum vents.

10. The method for producing a polyarylene sulfide resin composition according to claim 1, wherein an open vent is further provided between (3) kneading zone-a and (6) auxiliary material-feeding port.

11. The method for producing a polyarylene sulfide resin composition according to claim 1, wherein an open vent and a second vacuum vent are further provided in the order from an upstream side between (3) kneading zone-a and (6) auxiliary material-feeding port, and elements in a form of a sealing structure are installed at a front and a rear of the second vacuum vent to conduct degassing or evacuation from the two vacuum vents.

12. The method for producing a polyarylene sulfide resin composition according to claim 2, wherein the extruder is a twin-screw extruder.

13. The method for producing a polyarylene sulfide resin composition according to claim 2, wherein the shear rate in (3) kneading zone-a and (7) kneading zone-b is from 50/sec to 110/sec, and the total kneading time in (3) kneading zone-a and (7) kneading zone-b is from 20 seconds to 60 seconds.

14. The method for producing a polyarylene sulfide resin composition according to claim 3, wherein the shear rate in (3) kneading zone-a and (7) kneading zone-b is from 50/sec to 110/sec, and the total kneading time in (3) kneading zone-a and (7) kneading zone-b is from 20 seconds to 60 seconds.

15. The method for producing a polyarylene sulfide resin composition according to claim 2, wherein the shear rate in (3) kneading zone-a and (7) kneading zone-b is from 55/sec to 100/sec and the total kneading time in (3) kneading zone-a and (7) kneading zone-b is from 30 seconds to 55 seconds.

16. The method for producing a polyarylene sulfide resin composition according to claim 2, wherein the melt-kneading is conducted by introducing one or more screw elements having a structure which allows a part of molten resin to pass through in a direction opposite to a flow direction into (3) kneading zone-a, wherein a ratio of a structure in which a part of molten resin passes through in the direction opposite to the flow direction is such that a ratio of an area of a passing-through structure zone to an area of a circle having a diameter of a maximum dimension part of the screw element is from 5 to 40%, when the screw element is projected in a screw axis direction.

17. The method for producing a polyarylene sulfide resin composition according to claim 7, wherein a shape of the screw element having a structure in which a part of molten resin passes through in a direction opposite to a flow direction has a notch zone-formed structure at some points of its end.

18. The method for producing a polyarylene sulfide resin composition according to claim 2, wherein a second vacuum vent is further provided between (3) kneading zone-a and (6) auxiliary material-feeding port and elements in a form of a sealing structure are installed at a front and a rear of the second vacuum vent to conduct degassing or evacuation through two vacuum vents.

19. The method for producing a polyarylene sulfide resin composition according to claim 2, wherein an open vent is further provided between (3) kneading zone-a and (6) auxiliary material-feeding port.

20. The method for producing a polyarylene sulfide resin composition according to claim 2, wherein an open vent and a second vacuum vent are further provided in the order from an upstream side between (3) kneading zone-a and (6) auxiliary material-feeding port, and elements in a form of a sealing structure are installed at a front and a rear of the second vacuum vent to conduct degassing or evacuation from the two vacuum vents.

* * * * *